US012194486B1

(12) United States Patent
Liu

(10) Patent No.: US 12,194,486 B1
(45) Date of Patent: Jan. 14, 2025

(54) MULTIFUNCTIONAL SOLAR LANDSCAPE FOUNTAIN DEVICE

(71) Applicant: Shenzhen Haisituopu Technology Co., Ltd, Shenzhen (CN)

(72) Inventor: Yao Liu, Hunan (CN)

(73) Assignee: Shenzhen Haisituopu Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/765,201

(22) Filed: Jul. 5, 2024

(51) Int. Cl.

*B05B 17/08* (2006.01)
*F21S 9/03* (2006.01)
*F21V 3/02* (2006.01)
*F21V 23/04* (2006.01)
*F21V 23/06* (2006.01)
*F21Y 113/00* (2016.01)
*F21Y 115/10* (2016.01)

(52) U.S. Cl.

CPC ................ *B05B 17/08* (2013.01); *F21S 9/03* (2013.01); *F21V 3/02* (2013.01); *F21V 23/04* (2013.01); *F21V 23/06* (2013.01); *F21Y 2113/00* (2013.01); *F21Y 2115/10* (2016.08)

(58) Field of Classification Search

CPC .......... B05B 17/08; B05B 17/085; F21S 9/03; F21V 3/02; F21V 23/04; F21V 23/06; F21Y 2113/00; F21Y 2115/10

See application file for complete search history.

(56) References Cited

U.S. PATENT DOCUMENTS

2005/0129546 A1* 6/2005 Lin .......................... F21V 33/00 417/313
2005/0274816 A1* 12/2005 Yen .......................... B05B 17/08 239/23
2022/0341554 A1* 10/2022 Xu .......................... F21S 9/037
2022/0349569 A1* 11/2022 Xu .......................... F21V 33/00

FOREIGN PATENT DOCUMENTS

CN 201415579 Y * 3/2010 ............. B05B 17/08
DE 19911791 A1 * 9/2000 ............. B05B 17/08
EP 529613 A1 * 3/1993 ............. B05B 17/08
JP H06134368 A * 5/1994 ............. B05B 17/08
KR 20080002705 A * 1/2008 ............. B05B 17/08
KR 20080002706 A * 1/2008 ............. B05B 17/08
KR 101440561 B1 * 9/2014 ............. B05B 17/08

* cited by examiner

*Primary Examiner* — Darren W Gorman

(57) ABSTRACT

A multifunctional solar landscape fountain device is disclosed, including a first base, a column, and a colorful floating ball component. The column is fixedly mounted on a top of the first base, and a power supply module is provided in the first base. The colorful floating ball component includes a second base, an overflow tank, a crystal ball, several colorful LED lights, and an outlet eccentric nozzle. By use of the PLC control electrical box to control the colorful LED lights for working, to achieve the landscape effect of suspended rolling with light irradiation, reducing the water spray evaporation, thereby improving the viewing effect.

7 Claims, 4 Drawing Sheets

MULTIFUNCTIONAL SOLAR LANDSCAPE FOUNTAIN DEVICE

TECHNICAL FIELD

The present application relates to the technical field of fountain devices, and in particular to a multifunctional solar landscape fountain device.

BACKGROUND

A solar fountain is a decorative fountain device powered by solar energy, which converts sunlight into electricity through solar panels, so as to drive a fountain device for working. It is known for its high efficiency and energy saving, and is favored and praised by users.

Chinese patent CN214416808U discloses a novel solar fountain, including a solar panel. The upper end of the solar panel is uniformly provided with a plurality of battery cells along its circumference, the battery cells have a trapezoidal shape, and two adjacent battery cells are connected to each other via a bus bar. The lower end of the solar panel is installed with a controller and a water pump motor, and the water pump motor is provided with a water pumping port. The upper end of the solar panel is provided with an outlet pipe connected to the water pumping port. The head and tail ends of the bus bar run through to the lower end of the solar panel, and then connected to the controller and water the pump motor to form a closed loop, but it only has the effect of water spraying, the water is often scattered and then evaporated by sunshine air, so it needs frequent replenishment of water, thus the function is single.

SUMMARY

To overcome shortcomings of existing technologies, the present disclosure aims to provide a multifunctional solar landscape fountain device to address problems of the fountain device in the existing technologies only has the effect of spraying water and the water is often scattered and then evaporated by sunshine air, resulting in the fountain device needs to be regularly replenished water and has a single function.

In view of this, in some embodiments of the present disclosure, a multifunctional solar landscape fountain device is provided, including a first base, a column, and a colorful floating ball component. Herein the column is fixedly mounted on a top of the first base, and an power supply module is provided in the first base.

Herein the colorful floating ball component includes a second base, an overflow tank, a crystal ball, several colorful LED lights, and an outlet eccentric nozzle. The second base is fixedly mounted on a top of the column, the overflow tank is opened at an edge of the second base, the crystal ball is movably mounted on a top of the second base, and the colorful LED lights are fixed at a top edge of the second base. A PLC (i.e., programmable logic controller) control electrical box, a high-pressure water pump and a water tank are fixedly mounted inside of the first base, the pumping hose is fixedly mounted between a water port of the water tank and a suction end of the high-pressure water pump, the outlet eccentric nozzle is fixedly mounted in a middle of the second base, and a water supply hose is fixedly mounted on an input end of the outlet eccentric nozzle and a output end of the high-pressure water pump.

Optionally, a cambered surface of an outer wall of the crystal ball matches a shape of a cambered surface of the top of the second base, and an output end of the outlet eccentric nozzle is located at a bottom of the crystal ball.

Optionally, the colorful LED lights are arranged in a circular array on the top of the second base, and the colorful LED lights are electrically connected to the PLC control electrical box by means of wires.

Optionally, the high-pressure water pump is electrically connected to the PLC control electrical box by means of wires.

Optionally, the power supply module includes a solar panel, a glass cover, a return pipe, a battery, a physical control button, and an USB charging port. The solar panel is fixedly mounted on an inside of the top of the first base, the glass cover is fixedly mounted on a top of the solar panel, the return pipe is fixedly connected to one side of the glass cover, the battery is fixedly mounted on the inside of the first base, and the physical control button and the USB charging port are fixedly mounted on one side of the first base.

Optionally, one end of the return pipe is connected to interior of the water tank.

Optionally, the solar panel, the battery, the physical control button, and the USB charging port are electrically connected to the PLC control electrical box by means of wires.

As can be seen from the above technical solutions, the multifunctional solar landscape fountain device of the present disclosure has at least following advantages and beneficial effects.

1. The multifunctional solar landscape fountain device of the present disclosure, by setting the colorful floating ball component, specifically, the high-pressure water pump utilizes pipes to spray the water in the water tank through the outlet of the outlet eccentric nozzle, and the water sprayed from the outlet eccentric nozzle will subject a force to the crystal ball to deflect in one direction, making the crystal ball being suspended and rotated. And at the same time, by use of the PLC control electrical box to control the colorful LED lights for working, to achieve the landscape effect of suspended rolling with light irradiation, reducing the water spray evaporation, thereby improving the viewing effect.

2. The multifunctional solar landscape fountain device of the present disclosure, by setting the power supply module, specifically, a dual power supply mode of solar charging and external USB charging is used, and further with setting of the physical control button, the functional diversity of the fountain device is improved, thereby satisfying the choices of each user.

These features and advantages of the multifunctional solar landscape fountain device of the present disclosure will be disclosed in detail in the following specific embodiments as well as accompanying drawings.

BRIEF DESCRIPTION OF THE DRAWINGS

The multifunctional solar landscape fountain device of the present disclosure is further described in conjunction with the accompanying drawings.

Figure 1:
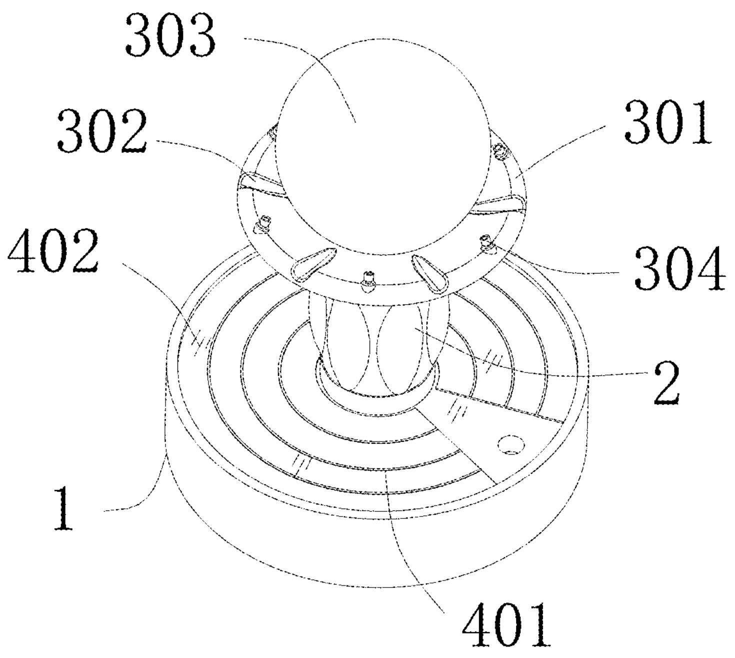
FIG. 1 shows a structure schematic diagram of a multi-functional solar landscape fountain device in accordance with some embodiments of the present disclosure.
Figure 2:
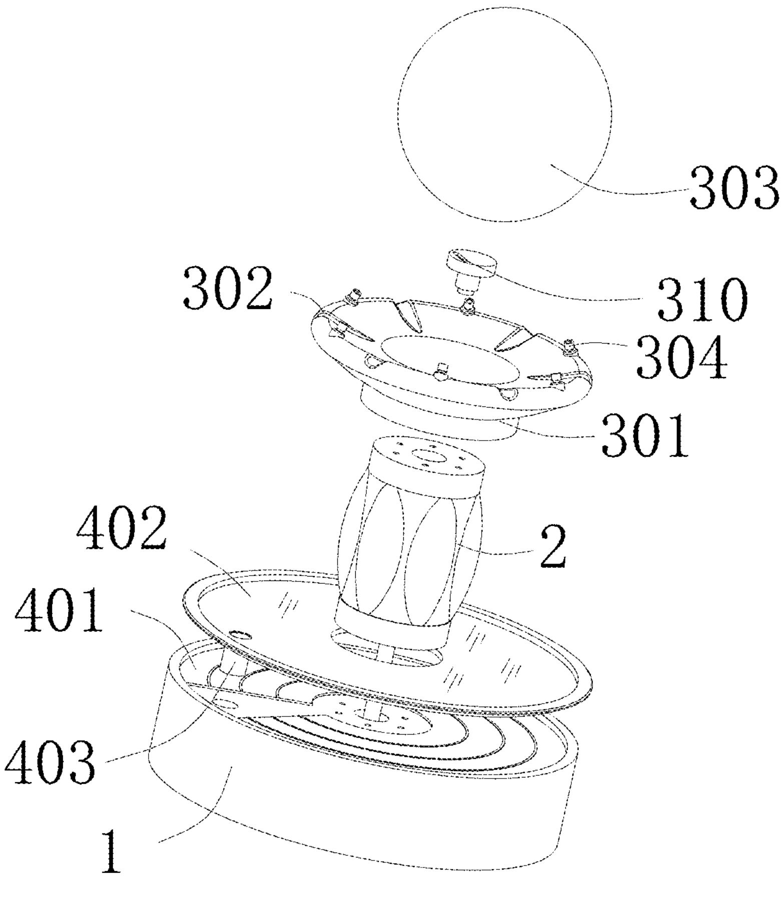
FIG. 2 shows an exploded view of a local structure of the multifunctional solar landscape fountain device in accordance with some embodiments of the present disclosure.

In the drawings, reference signs are as follows. 1. First base, 2. Column, 301. Second base, 302. Overflow tank, 303. Crystal ball, 304. Colorful LED light, 305. PLC control electrical box, 306. High-pressure water pump, 307. Water tank, 308. Pumping hose, 309. Water supply hose, 310. Outlet eccentric nozzle, 401. Solar panel, 402. Glass cover, 403. Return pipe, 404. Battery, 405. Physical control button, 406. USB charging port.

DETAILED DESCRIPTION OF THE EMBODIMENTS

The technical solutions of the embodiments of the present disclosure are explained and illustrated below in connection with the accompanying drawings of the embodiments of the present disclosure. However, the following embodiments are only preferred embodiments of the present disclosure and are not exhaustive. Based on the embodiments of the present disclosure, other embodiments obtained by a person skilled in the art without making creative labor shall fall within the scope of the protection of the present disclosure.

The multifunctional solar landscape fountain device of the present disclosure will be specifically described below in conjunction with the accompanying drawings.

Embodiment 1

For case of understanding, referring to FIG. 1 to FIG. 4, in embodiment 1 of the present disclosure, a multifunctional solar landscape fountain device is provided, including a first base 1, a column 2, and a colorful floating ball component. Herein the column 2 is fixedly mounted on a top of the first base 1, and a power supply module is provided in the first base 1.

The colorful floating ball component includes a second base 301, an overflow tank 302, a crystal ball 303, several colorful LED lights 304, and an outlet eccentric nozzle 310. The second base 301 is fixedly mounted on a top of the column 2, the overflow tank 302 is opened at an edge of the second base 301, the crystal ball 303 is movably mounted on a top of the second base 301, and the colorful LED lights 304 are fixed at a top edge of the second base 301. A PLC control electrical box 305, a high-pressure water pump 306 and a water tank 307 are fixedly mounted inside of the first base 1, the pumping hose 308 is fixedly mounted between a water port of the water tank 307 and a suction end of the high-pressure water pump 306, the outlet eccentric nozzle 310 is fixedly mounted in a middle of the second base 301, and a water supply hose 309 is fixedly mounted on an input end of the outlet eccentric nozzle 310 and an output end of the high-pressure water pump 306. A cambered surface of an outer wall of the crystal ball 303 matches a shape of a cambered surface of the top of the second base 301, and an output end of the outlet eccentric nozzle 310 is located at a bottom of the crystal ball 303. The colorful LED lights 304 are arranged in a circular array on the top of the second base 301, and the colorful LED lights 304 are electrically connected to the PLC control electrical box 305 by means of wires. The high-pressure water pump 306 is electrically connected to the PLC control electrical box 305 by means of wires.

It should be noted that, by setting the crystal ball 303 and a number of the colorful LED lights 304 on the second base 301, and with the PLC control electrical box 305 is set up to control the high-pressure water pump 306 and the colorful LED lights 304 for working, and then the high-pressure water pump 306 utilizes the pumping hose 308 and the water supply hose 309 to spray the water in the water tank 307 through the outlet of the outlet eccentric nozzle 301, the water sprayed out from the outlet eccentric nozzle 310 will subject a force to the crystal ball 303 to deflect in one direction, making the crystal ball 303 being suspended and rotated. And at the same time, the colorful LED lights 304 work, to irradiate the crystal ball 303, so as to make it luminous and realize the landscape effect of suspended rolling and light irradiation. Herein inside of the PLC control electrical box 305 includes a microprocessor module, a power supply module, a charging module, and an infrared remote control module. The colorful LED lights 304, the high-pressure water pump 306, the microprocessor module, the power supply module, the charging module, and the infrared remote control module are all well-known parts and components, and their types need to be selected according to the volume and style of the landscape fountain device, and will not be repeated.

Embodiment 2

Figure 3:
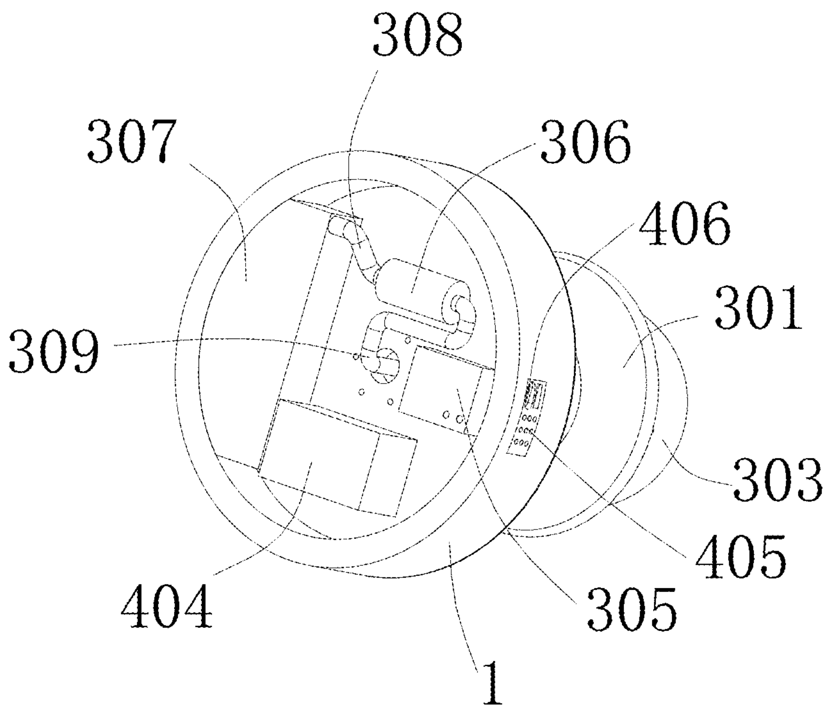
FIG. 3 shows an exploded view of a local structure of bottom of the multifunctional solar landscape fountain device in accordance with some embodiments of the present disclosure.
Figure 4:
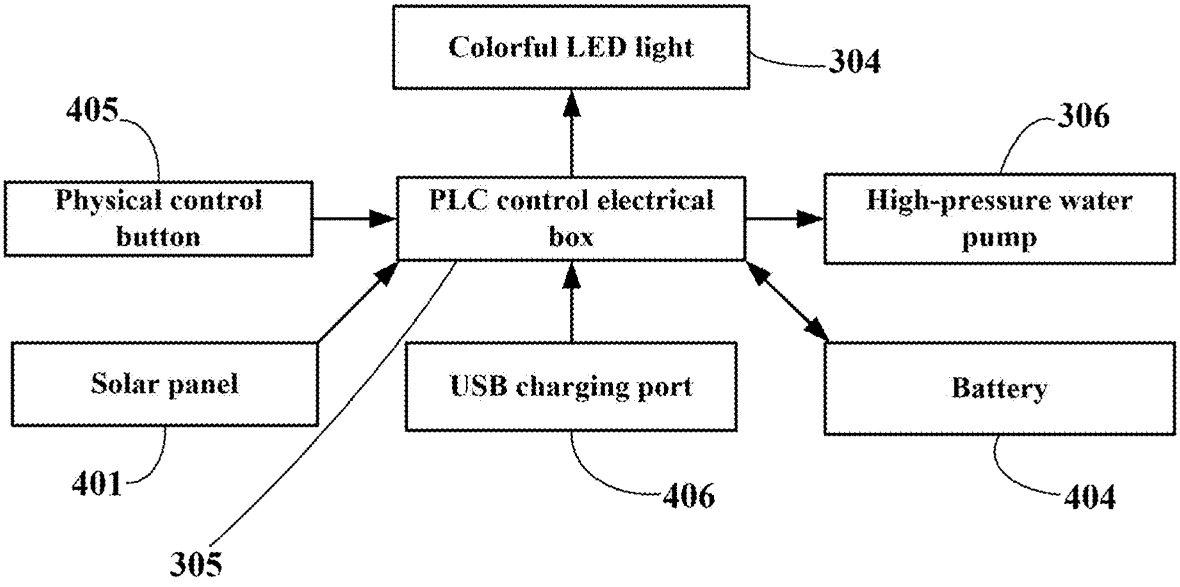
FIG. 4 shows a working system diagram of the multi-functional solar landscape fountain device in accordance with some embodiments of the present disclosure.

In some embodiments of the present disclosure, referring to FIG. 3 and FIG. 4, the power supply module includes a solar panel 401, a glass cover 402, a return pipe 403, a battery 404, a physical control button 405, and an USB charging port 406. The solar panel 401 is fixedly mounted on an inside of the top of the first base 1, the glass cover 402 is fixedly mounted on a top of the solar panel 401, the return pipe 403 is fixedly connected to one side of the glass cover 402, the battery 404 is fixedly mounted on the inside of the first base 1, and the physical control button 405 and the USB charging port 406 are fixedly mounted on one side of the first base 1. One end of the return pipe 403 is connected to interior of the water tank 307. The solar panel 401, the battery 404, the physical control button 405, and the USB charging port 406 are electrically connected to the PLC control electrical box 305 by means of wires.

It should be noted that, by setting the solar panel 401 and the USB charging port 406, for charging the battery 404, then the battery can supply power to the colorful LED lights 304 and the high-pressure water pump 306, thus a dual-charging method is adopted to give more selection for users. Moreover, by setting the physical control button 405, this easy to manually control and adjust the PLC control electrical box 305, the controller inside of the PLC control electrical box 305 is programmed, and the programming modes include a night mode, an automatic mode, a night priority mode, a manual mode, physical buttoning, timing, and night working time power display. The night mode: solar energy only charge during the day, but the high-pressure water pump 306 and the colorful LED lights 304 does not work during the day, the colorful LED lights 304 and the high-pressure water pump 306 will be turned on automatically at night. The automatic mode: identify the capacity ratio of the battery 404, when it reaches 70% and above, the battery will assist the solar panel 401 to drive the water pump for working, when the capacity of the battery 404 is less than 70%, the solar panel 401 will give priority to the battery 404 for charging, at this time the high-pressure water pump 306 will work intermittently under the strength and weakness of sunlight. The night priority mode: the high-pressure water pump 306 works under the strength and weakness of sunlight, the solar energy is preferentially filled with the battery, and excess is supplied to the high-pressure water pump 306. The manual mode: select this mode to force the lights to turn on during the day and night, automatically identify the capacity of the battery 404, after charging in proportion according to the automatic mode, then release the energy when excess. The physical buttoning: the physical control button 405 can be switch to automatic mode or night mode, with automatic memory function, the system will automatically remember the user's setting mode. Timing: the user can set according to personal preferences. Night working time power display: the user can view the capacity of the battery, the system will prompt the user for charging according to the prompt of the flashing power ratio of the LED light, the user can charge this product with USB by themselves, not be subjected by a long time without sunlight and the solar energy is not available.

The solar panel 401, the USB charging port 406, and the battery 404 in the multifunctional solar landscape fountain device of the present disclosure are well-known parts and components and will not be repeated herein.

Working principle: when in use, the PLC control electrical box 305 is used to control the high-pressure water pump 306 and the colorful LED lights 304 for working, then the high-pressure water pump 306 utilizes the pumping hose 308 and the water supply hose 309 to spray the water in the water tank 307 through the outlet of the outlet eccentric nozzle 310. The water sprayed by the outlet eccentric nozzle 310 will subject a force to the crystal ball 303 to deflect in one direction, making the crystal ball 303 being suspended and rotated. At this time, the colorful LED lights 304 work, to irradiate the crystal ball 303, so that it glows, to achieve the landscape effect of suspended rolling with light irradiation. When in the night mode, the solar energy only charges during the day, but the high-pressure water pump 306 and the colorful LED lights 304 don't work during the day, until the colorful LED lights 304 and the high-pressure water pump 306 are turned on automatically at night. When in automatic mode, the capacity ratio of the battery 404 will be recognized, when it reaches 70% and above, the battery will assist the solar panel 401 to drive the water pump for working, while when the capacity of the battery 404 is less than 70%, the solar panel 401 will give priority to the battery 404 for charging, and this time the high-pressure water pump 306 will work intermittently under the strength and weakness of sunlight. When in night priority mode, the high-pressure water pump 306 is worked under the strength and weakness of sunlight, the solar energy is preferentially filled with the battery, and excess is supplied to the high-pressure water pump 306. Then the manual mode can be chosen, the lights will be forced to turn on during the day and night when chosen this mode, the capacity of the battery 404 is automatically identified, after charging in proportion according to the automatic mode, then release the energy when excess.

As mentioned above, the above embodiments are only used to illustrate the technical solutions of the present disclosure, and not to limit thereto. Although the present disclosure has been described in detail with reference to the above embodiments, a person of ordinary skill in the art should understand that it is still possible to modify the technical solutions recorded in the above embodiments or to replace some of the technical features therein with the same, and such modifications or replacements do not make the corresponding technical solutions deviate from the concept of the technical solutions of the embodiments of the present disclosure.

What is claimed is:

1. A multifunctional solar landscape fountain device, comprising a first base, a column, and a colorful floating ball component;

wherein the column is fixedly mounted on a top of the first base, and a power supply module is provided in the first base;

wherein the colorful floating ball component comprises a second base, an overflow tank, a crystal ball, several colorful LED lights, and an outlet eccentric nozzle;

wherein the second base is fixedly mounted on top of the column, the overflow tank is opened at an edge of the second base, the crystal ball is movably mounted on a top of the second base, and the colorful LED lights are fixed at a top edge of the second base;

wherein a PLC control electrical box, a high-pressure water pump and a water tank are fixedly mounted inside of the first base, a pumping hose is fixedly mounted between a water port of the water tank and a suction end of the high-pressure water pump; and wherein the outlet eccentric nozzle is fixedly mounted in a middle of the second base, and a water supply hose is fixedly mounted on an input end of the outlet eccentric nozzle and an output end of the high-pressure water pump.

2. The multifunctional solar landscape fountain device according to claim 1, wherein a cambered surface of an outer wall of the crystal ball matches a shape of a surface of the top of the second base, and an output end of the outlet eccentric nozzle is located at a bottom of the crystal ball.

3. The multifunctional solar landscape fountain device according to claim 1, wherein the colorful LED lights are arranged in a circular array on the top of the second base, and the colorful LED lights are electrically connected to the PLC control electrical box by means of wires.

4. The multifunctional solar landscape fountain device according to claim 1, wherein the high-pressure water pump is electrically connected to the PLC control electrical box by means of wires.

5. The multifunctional solar landscape fountain device according to claim 1, wherein the power supply module comprises a solar panel, a glass cover, a return pipe, a battery, a physical control button, and a USB charging port; and wherein the solar panel is fixedly mounted on an inside of the top of the first base, the glass cover is fixedly mounted on a top of the solar panel, the return pipe is fixedly connected to one side of the glass cover, the battery is fixedly mounted on the inside of the first base, and the physical control button and the USB charging port are fixedly mounted on one side of the first base.

6. The multifunctional solar landscape fountain device according to claim 5, wherein one end of the return pipe is connected to interior of the water tank.

7. The multifunctional solar landscape fountain device according to claim 5, wherein the solar panel, the battery, the physical control button, and the USB charging port are electrically connected to the PLC control electrical box by means of wires.

* * * * *